United States Patent [19]
Mack et al.

[11] Patent Number: 5,838,723
[45] Date of Patent: Nov. 17, 1998

[54] DUAL 10BASE-T AND 100BASE-TX TRANSMISSION TERMINATION CIRCUIT

[75] Inventors: Michael P. Mack, Mountain View; Phillip R. Marzolf, Campbell, both of Calif.

[73] Assignee: Micro Linear Corporation, San Jose, Calif.

[21] Appl. No.: 624,189

[22] Filed: Mar. 28, 1996

[51] Int. Cl.$^6$ .................................................. H04B 1/40
[52] U.S. Cl. ........................................ 375/220; 340/825
[58] Field of Search .................................. 375/219, 257, 375/220; 455/73.74; 340/825, 825.06, 825.36, 825.37, 825.71, 825.77

[56] References Cited

U.S. PATENT DOCUMENTS

| 4,782,300 | 11/1988 | Bonaccio et al. | 324/509 |
| 5,541,957 | 7/1996 | Lau | 375/258 |

OTHER PUBLICATIONS

"Application Note 44 Designing Fast Ethernet and FDDI–UTP Transceivers", Micro Linear Corporation, Aug. 1995.
"Application Brief 3 ML6673 and Baseline Wander", Micro Linear Corporation, Jul. 1995.
"ML–6673 Fast Ethernet/FDDI TP–PMD Transceiver", Micro Linear Corporation, May 1995.
"Application Note 28 Designing a 100MbP/s UTP Transceiver for Local Area Network", Mirco Linear Corporation, Mar. 1994.
"DP 83840 10/100 Mb/s Ethernet Physical Layer", National Semiconductor Corporation, Feb. 22, 1995.

Primary Examiner—Chi H. Pham
Assistant Examiner—William Luther
Attorney, Agent, or Firm—Haverstock & Owens LLP

[57] ABSTRACT

A transmission termination circuit able to reduce transmission signal reflections and resultant data corruption such that a single network may selectively communicate data using either a voltage driven transceiver or a current driven transceiver. A 10BASE-T transceiver has differential voltage driven outputs. A first output is coupled to a first terminal of a primary winding of a transformer through a first resistor. A second output is coupled to a second terminal of the first primary winding through a second resistor. A 100BASE-TX transceiver has differential current driven outputs. A first output is coupled to a first terminal of a second primary winding of the transformer. A second output is coupled to a second terminal of the second primary winding. A resistive snubber comprising a resistor in series with a capacitor is coupled across the 100BASE-TX outputs. A twisted-pair network is coupled to a secondary winding of the transformer. When transmitting in 10BASE-T format, the resistive snubber suppresses voltage transients caused by a leakage inductance in series with the reflected 10BASE-T circuit. The snubber has a time constant which is large enough suppress transients during transmission by the 100BASE-TX circuit, but small enough to not interfere with transmission by the 10BASE-T transceiver. The snubber matches impedances of the 10BASE-T and the 100BASE-TX transceivers over a wide range of frequencies to prevent signal reflections.

23 Claims, 3 Drawing Sheets

DUAL 10BASE-T AND 100BASE-TX TRANSMISSION TERMINATION CIRCUIT

FIELD OF THE INVENTION:

The present invention relates to the field of termination circuits for computer networks. More particularly, the present invention relates to the field of termination circuits for computer networks wherein the network has both a current driven transceiver and a voltage driven transceiver.

BACKGROUND OF THE INVENTION:

It is well known that in order to successfully transmit data over a computer network, such as a twisted pair network, the transmission lines must be properly terminated to prevent signal reflections and resultant data corruption. It is also well known that computer networks may comprise devices designed for use in conjunction with a transceiver driver circuit that is either a voltage driven transceiver or a current driven transceiver.

It is therefore desirable that a single computer network have an ability to transmit and receive data from devices that are designed for use with a voltage driven transceiver and to transmit and receive data from devices that are designed for use with a current driven transceiver. However, a different terminator circuit is generally required to terminate the transmission lines for a voltage driven transceiver than is required for a current driven transceiver. Therefore, what is needed is a transceiver termination circuit having an ability to reduce transmission signal reflections and resultant data corruption such that data may be successfully communicated over a single computer network using either a voltage driven transceiver or a current driven transceiver.

An example of a voltage driven transceiver is a 1-to-2 step-up, 10BASE-T transceiver which transmits data in 10BASE-T format at 10 mega-bits per second and is available from National Semiconductor Corporation under the part number DP 83840. An example of a current driven transceiver is a 100BASE-TX transceiver which transmits data in 100BASE-TX format at 100 mega-bits per second and is available from Micro Linear Corporation under part number ML6673. Micro Linear Corporation is located at 2092 Concourse Drive, in San Jose, Calif., zip code 95131. There is a need for a termination circuit that would allow a computer or other device to communicate over either a 10BASE-T or a 100BASE-TX network. Unfortunately, there is no known conventional termination circuit that allows a voltage driven 10BASE-T driver and a current driven 100BASE-TX to be selectively active.

Therefore, what is further needed is a transmission termination circuit for use with both a 10BASE-T transceiver and a 100BASE-TX transceiver which has an ability to reduce interference and signal reflections so that data may be communicated over a single twisted pair computer network using either the 10BASE-T transceiver or the 100BASE-TX transceiver.

SUMMARY OF THE INVENTION

The invention is a transmission termination circuit having an ability to reduce transmission signal reflections and resultant data corruption such that a single computer network may successfully communicate data using either a voltage driven transceiver or a current driven transceiver. The network includes a voltage driven transceiver and a current driven transceiver which are alternately selectable for communicating data as required by the circumstances.

The preferred embodiment of the invention comprises a 10BASE-T transceiver which has differential voltage driven transmit outputs. A first transmit output is coupled to a first terminal of a first resistor. A second transmit output is coupled to a first terminal of a second resistor. A second terminal of the first resistor is coupled to a first terminal of a primary winding of a transmit transformer. A second terminal of the second resistor is coupled to a second terminal of the first primary winding of the transmit transformer.

The preferred embodiment of the invention also comprises a 100BASE-TX transceiver which has differential current driven transmit outputs. A first transmit output is coupled to a first terminal of a second primary winding of the transmit transformer. A second transmit output is coupled to a second terminal of the second primary winding of the transmit transformer.

A resistive snubber comprising a resistor in series with a capacitor is coupled across the 100BASE-TX differential transmit outputs. A voltage supply is coupled to a center tap of the second primary winding. A twisted-pair computer network is coupled to a secondary winding of the transmit transformer.

When transmitting data in 100BASE-TX format, the invention achieves the proper termination of the 100BASE-TX signal from the reflected 10BASE-T circuit by shorting the 10BASE-T transmit outputs to ground through two transistors. The resistive snubber suppresses voltage transients caused by a leakage inductance of the transmit transformer in series with the reflected 10BASE-T transceiver. In the preferred embodiment, the snubber has a time constant of 2.5 nanoseconds which, during 100BASE-TX transmission, allows the load current from the 100BASE-TX transceiver to be shared by the twisted pair network and the termination resistance of R1 and R2.

Without the resistive snubber, the initial surge of current from the 100BASE-TX transmitter would cause a large voltage transient due to the inductive load imposed by the leakage inductance of the transformer in series with the normal load. The resistive snubber absorbs much of this initial surge of current without significantly interfering with the return loss of the 10BASE-T transceiver.

The time constant of the resistive snubber is selected such that during 10BASE-T transmission, the resistive snubber does not present a significant load to the 10BASE-T transceiver when it transmits data up to the maximum frequency of data transmission. The resistive snubber allows the load current to pass from the 10BASE-T termination resistors to the twisted pair network. Therefore, the time constant is large enough suppress voltage transients during transmission by the 100BASE-TX transceiver, but small enough to not interfere with transmission by the 10BASE-T transceiver.

Thus, the snubber serves to match the impedances of the 10BASE-T and the 100BASE-TX transceiver driver circuits over a wide range of frequencies to prevent signal reflections. Proper selection of snubber resistor and snubber capacitor values limits the impedance of the parallel combination of driver circuits to avoid transmission signal reflections and resonance on the twisted pair network transmission lines.

DETAILED DESCRIPTION OF THE PREFERRED EMBODIMENT

Figure 1:
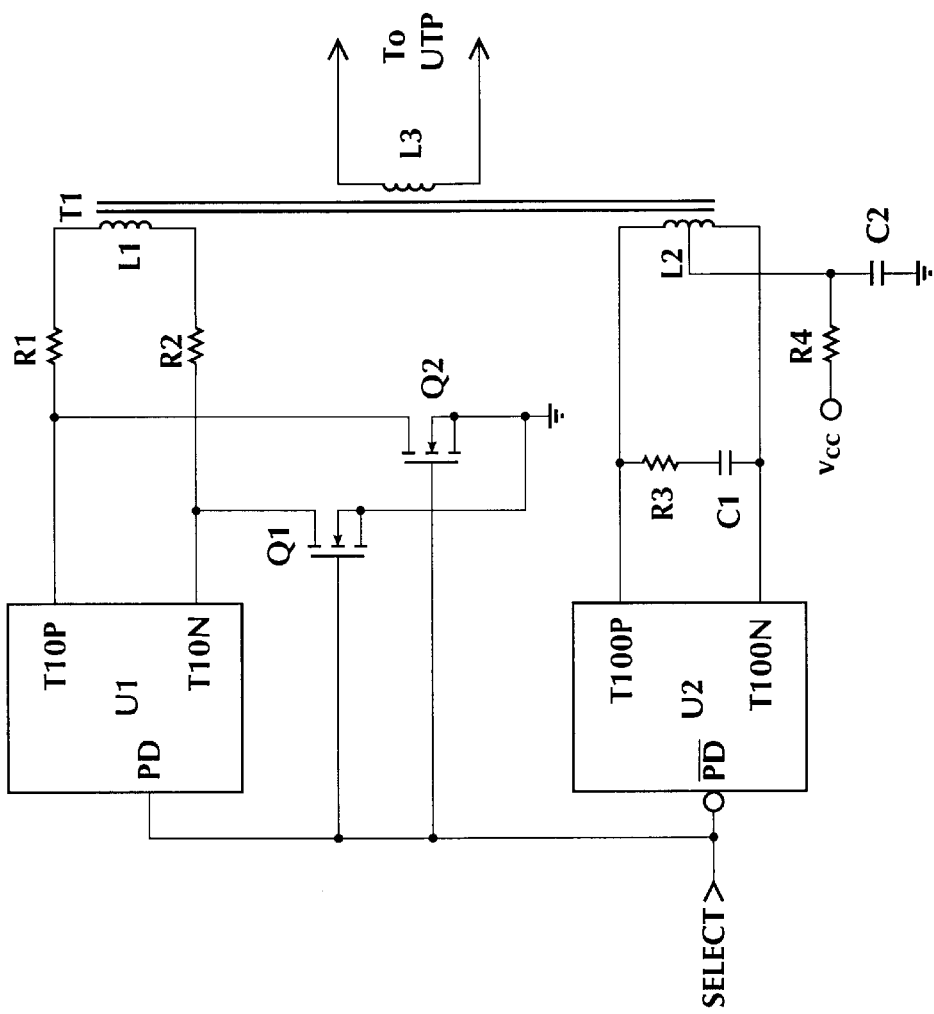
FIG. 1 illustrates a schematic diagram of the present invention.

FIG. 1 shows a schematic diagram of the present invention. A 10BASE-T transceiver U1 has a pair of voltage driven differential transmit outputs T10P and T10N and a power down input signal PD. When the power down input PD is coupled to a logical high voltage level, the differential outputs T10P and T10N are in a high impedance state. When the power down input PD is coupled to a logical low voltage level, the differential transmit outputs T10P and T10N are active. The 10BASE-T transceiver U1 also has a differential transmit input pair (not shown) for receiving data to be transmitted over the network. The 10BASE-T transceiver U1 also has a differential receive input pair (not shown) for receiving data from the network and a differential receive output pair (not shown) for outputting the data that was received from the network by the differential receive input pair. In the preferred embodiment, the transceiver U1 is Part Number DP 83840, available from National Semiconductor, Corp., but could be any voltage driven transceiver, such as a voltage driven 10BASE-T transceiver.

The differential transmit output T10P is coupled to a first terminal of a resistor R1 and to a drain of an NMOSFET Q2. The differential transmit output T10N is coupled to a first terminal of a resistor R2 and to a drain of an NMOSFET Q1. A second terminal of the resistor R1 is coupled to a first terminal of a first primary winding L1 of a transmit transformer T1. A second terminal of the resistor R2 is coupled to a second terminal of the first primary winding L1. A source of the transistor Q1 and a source of the transistor Q2 are coupled to the ground node.

A 100BASE-TX transceiver U2 has a pair of current driven differential transmit outputs T100P and T100N and a negated power down input signal PD-not. When the negated power down input PD-not is coupled to a logical low voltage level, the differential outputs T100P and T100N are in a high impedance state and are not active. When the negated power down input PD-not is coupled to a logical high voltage level, the differential transmit outputs T100P and T100N are active. The 100BASE-TX transceiver U2 also has a differential transmit input pair (not shown) for receiving data to be transmitted over the network. The 100BASE-TX transceiver U2 also has a differential receive input pair (not shown) for receiving data from the network and a differential receive output pair (not shown) for outputting the data that was received from the network by the differential receive input pair. In the preferred embodiment, the transceiver U2, is Part Number ML6673, available from Micro Linear Corp., but could be any current driven transceiver, such as a current driven 100BASE-TX transceiver.

The differential transmit output T100P is coupled to a first terminal of a second primary winding L2 of the transmit transformer T1 and to a first terminal of a resistor R3. The differential transmit output T100N is coupled to a second terminal of the second primary winding L2 and to a first terminal of a capacitor C1. A second terminal of the capacitor C1 is coupled to a second terminal of the resistor R3.

A center tap of the second primary winding L2 is coupled to a first terminal of a resistor R4 and to a first terminal of a capacitor C2. A second terminal of the resistor R4 is coupled to a supply voltage Vcc. A second terminal of the capacitor is coupled to the ground node. In the preferred embodiment, R4 is 10 ohms and C2 is 50 nF. This arrangement couples the center tap of L2 to Vcc so that the differential transmit outputs T100P and T100N have a common-mode bias of nearly Vcc (Vcc is typically 5.0 volts) while R4 and C2 filter noise coupled from Vcc.

A logical signal SELECT, generated by an external control circuit, is coupled to the power down input PD of the 10BASE-T transceiver U1, to the negated power down input PD-not of the 100BASE-TX transceiver U2, to a gate of the transistor Q1 and to a gate of the transistor Q2.

A first terminal of a secondary winding L3 of the transmit transformer T1 is coupled to a first terminal of a twisted pair network. A second terminal of the secondary winding L3 is coupled to a second terminal of the twisted pair network.

In the preferred embodiment, the 10BASE-T transceiver U1 requires a 1-to-2 step-up transformer. For this reason, the number of windings comprising L3 is twice the number of windings comprising L1 and the resistors R1 and R2 are each 12.5 ohms. However, the 10BASE-T transceiver U1 could be any voltage driven transceiver, such as a voltage driven 10BASE-T transceiver. For example, if the transceiver U1 required an equal number of windings on the primary and secondary windings of the transmit transformer (i.e. a 1-to-1 transformer), it will be apparent that L1 and L3 would have an equal number of windings and R1 and R2 would each be 50 ohms.

When the logic signal SELECT is at a low logic level, the 10BASE-T transceiver U1 is activated, Q1 and Q2 are off and the 100BASE-TX transceiver U2 is de-activated, wherein the differential transmit outputs T100P and T100N are in a high impedance state. When the logic signal SELECT is at a high logic level, the 100BASE-TX transceiver is activated, the 10BASE-T transceiver is de-activated, wherein the differential transmit outputs T10P and T10N are in a high impedance state and the transistors Q1 and Q2 are on, effectively shorting each of the differential transmit outputs T10P and T10N to ground. Therefore, when it is desired to transmit data over the network in 10BASE-T format, the 10BASE-T transceiver is selected to drive the twisted pair network by lowering the logic signal SELECT to a low logic level. Conversely, when it is desired to transmit data over the network in 100BASE-TX format, the 100BASE-TX transceiver is selected to drive the twisted pair network by raising the logic signal SELECT to a high logic level.

When transmitting data in 100BASE-TX format, the invention achieves the proper termination of the 100BASE-TX signal from the reflected 10BASE-T circuit by shorting the 10BASE-T outputs to ground through the transistor Q1 and through the transistor Q2. This results in a reflected termination impedance of 100 ohms due to the resistor R1, the resistor R2 and the transformer T1. The resistor R3 and the capacitor C1 comprise the resistive snubber. During transmission by the 100BASE-TX transceiver, the resistive snubber suppresses voltage transients caused by a leakage inductance in series with the reflected 10BASE-T transceiver termination. This leakage inductance is a leakage inductance of the transmit transformer T1.

In the preferred embodiment, R3 has a value of 100 ohms and C1 has a value of 25 pF. This results in a time constant of 2.5 ns which, during transmission by the 100BASE-TX transceiver, allows the load current from the 100BASE-TX transceiver to be shared by the twisted pair network and the termination resistance of R1 and R2.

Without the resistive snubber, the initial surge of current from the 100BASE-TX transmitter would cause a large voltage transient due to the inductive load imposed by the leakage inductance of the transformer in series with the normal load. The resistive snubber absorbs much of this initial surge of current without significantly interfering with the return loss of the 10BASE-T transceiver.

The time constant is selected such that when transmitting in 10BASE-T format, the resistive snubber does not present a significant load to the 10BASE-T transceiver when it transmits data at frequencies up to the maximum frequency of level changes in the data transmitted. The resistive snubber allows the load current to pass from the 10BASE-T termination resistors R1 and R2 to the twisted pair network.

It will be apparent that the frequency of data transmission is measured in bits-per-second, however, the response of the resistive snubber depends upon the frequency of level changes in the data signal. The frequency of level changes in the data signal depends upon the rate at which data bits are transmitted and upon the data content. For example, data containing long strings of ones or zeros and transmitted at a high rate of bits-per-second, may have a frequency of level changes comparable to data containing few strings of ones or zeros, but transmitted at a lower rate of bits-per-second. Thus, the time constant is selected according to the expected frequency of level changes in the data.

Thus, the resistive snubber serves to match the load impedances of the 10BASE-T and the 100BASE-TX transceiver driver circuits over a wide range of frequencies to prevent voltage transients when transmitting data in 100BASE-TX format. Proper selection of snubber resistor and snubber capacitor values limits the impedance of the parallel combination of driver circuits to avoid transmission signal reflections when transmitting with the 10BASE-T transceiver and to avoid resonance on the twisted pair network transmission lines when transmitting with the 100BASE-TX transceiver. The time constant is large enough suppress voltage transients during transmission by the 100BASE-TX transceiver, but small enough to not interfere with transmission by the 10BASE-T transceiver.

Figure 2:
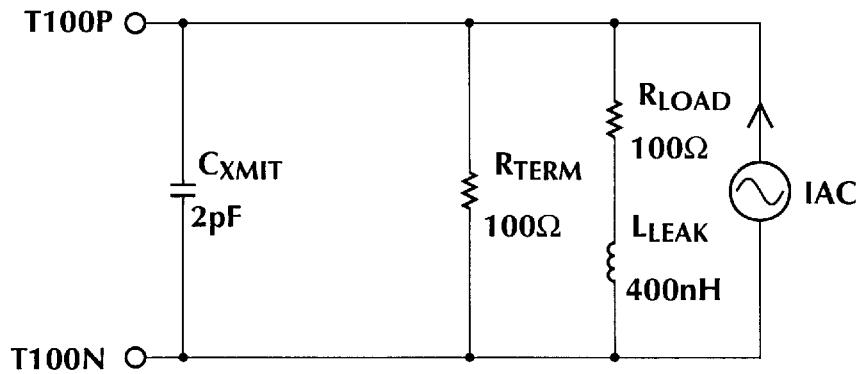
FIG. 2 illustrates a schematic diagram of a two-port model of a single 10BASE-T transceiver termination.

FIG. 2 illustrates a schematic diagram of a two-port model of a single 100BASE-TX transceiver termination. This two-port model is representative of a termination scheme where the 100BASE-TX transceiver is coupled to a network by itself. This circuit represents a means of terminating a current driven 100BASE-TX transceiver without circuits associated with a 10BASE-T transceiver.

Referring to FIG. 2, a first terminal of an alternating current source IAC is coupled to a node T100P. The current source IAC represents the output current of the current driven 100BASE-TX transceiver. A second terminal of the alternating current source IAC is coupled to the T100N node. A first terminal of a capacitor Cxmit, a first terminal of a resistor Rterm, and a first terminal of a resistor Rload are coupled to the node T100P. A second terminal of the capacitor Cxmit, a second terminal of the resistor Rterm, and first terminal of an inductor Lleak are coupled to the node T100N. A second terminal of the inductor Lleak is coupled to a second terminal of the resistor Rload.

In FIG. 2, Rterm represents the normal means of terminating a current driven transceiver. The value of Rterm is 100 ohms to match the impedance of the twisted pair network. It will be apparent that the resistors R1 and R2 in FIG. 1 are each 12.5 ohms due to the 1-to-2 step-up transformer and because the resistors R1 and R2 in FIG. 1 are effectively in series with each other. Rload represents the impedance of the twisted pair network which is 100 ohms, however, the resistance has in series with it a leakage inductance of the transformer of approximately 400 nH. The capacitor Cxmit represents the parasitic junction capacitance of the differential output drivers within the 100BASE-TX transceiver U2 (FIG. 1) which is approximately 2 pF.

Figure 3:
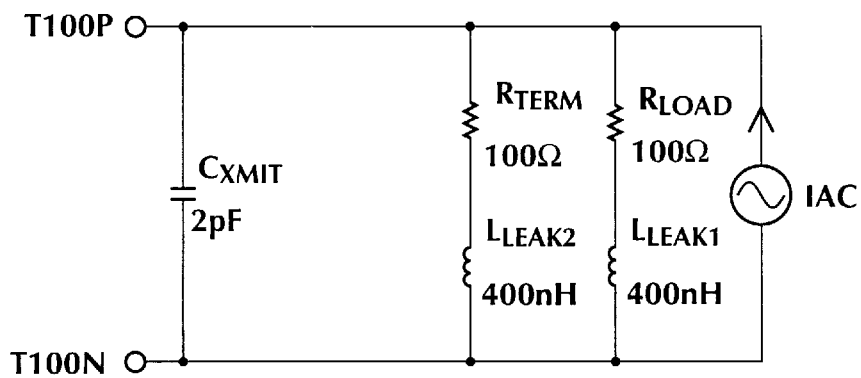
FIG. 3 illustrates a schematic diagram of a two-port model of a dual 10BASE-T and 100BASE-TX transceiver termination without a snubber.

FIG. 3 illustrates a schematic diagram of a two-port model of a dual 10BASE-T and 100BASE-TX transmission termination circuit without a snubber. This two-port model is representative of a termination scheme for the dual 10BASE-T and 100BASE-TX transceiver shown in FIG. 1 without the snubber comprising the resistor R3 and the capacitor C1.

Referring to FIG. 3, a first terminal of an alternating current source IAC is coupled to a node T100P. A second terminal of the alternating current source IAC is coupled to the node T100N. A first terminal of a capacitor Cxmit, a first terminal of a resistor Rterm, and a first terminal of a resistor Rload are coupled to the node T100P. A second terminal of the capacitor Cxmit, a first terminal of an inductor Lleak2, and a first terminal of an inductor Lleak1 are coupled to the node T100N. A second terminal of the inductor Lleak is coupled to a second terminal of the resistor Rload. A second terminal of the inductor Lleak2 is coupled to a second terminal of the resistor Rterm.

The two-port model shown in FIG. 3 differs from the two-port model in FIG. 2 because there is now a leakage inductance Lleak2 of approximately 400 nH in series with the resistor Rterm which is representative of the leakage inductance of the transformer.

Figure 4:
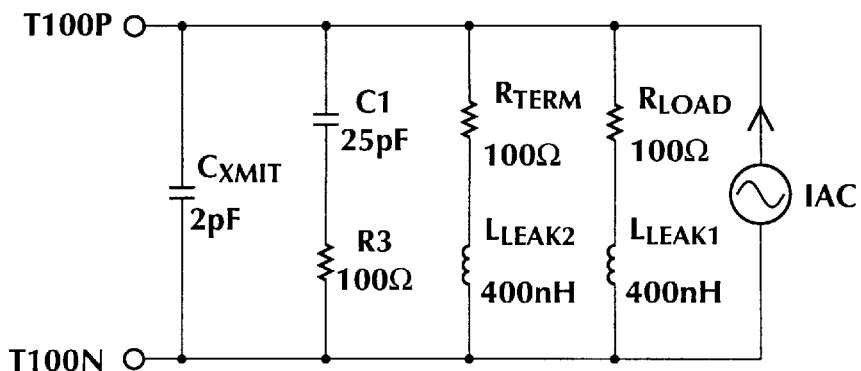
FIG. 4 illustrates a schematic diagram of a two-port model of a dual 10BASE-T and 100BASE-TX transceiver termination including a snubber.

FIG. 4 illustrates a schematic diagram of a two-port model of a dual 10BASE-T and 100BASE-TX transceiver termination including a snubber. This two-port model is representative of the termination scheme for the dual 10BASE-T and 100BASE-TX transceiver shown in FIG. 1 including the snubber comprising the resistor R3 and the capacitor C1.

The two-port model shown in FIG. 4 differs from the two-port model in FIG. 3 because there is now a snubber coupled across the terminals of the alternating current source IAC. The snubber comprises the resistor R3 coupled in series with the capacitor C1. As in FIG. 1, R3 is preferably 100 ohms and C1 is preferably 25 pF, but R3 and/or C1 could have a different value.

Referring to FIG. 4, a first terminal of an alternating current source IAC is coupled to a node T100P. A second terminal of the alternating current source IAC is coupled to the node T100N. A first terminal of a capacitor Cxmit, a first terminal of a capacitor C1, a first terminal of a resistor Rterm, and a first terminal of a resistor Rload, are coupled to the node T100P. A second terminal of the capacitor Cxmit, a first terminal of a resistor R3, a first terminal of an inductor Lleak2, and a first terminal of an inductor Lleak1, are coupled to the node T100N. A second terminal of the inductor Lleak1 is coupled to a second terminal of the resistor Rload. A second terminal of the inductor Lleak2 is coupled to a second terminal of the resistor Rterm. A second terminal of the resistor R3 is coupled to a second terminal of the capacitor C1.

Figure 5:
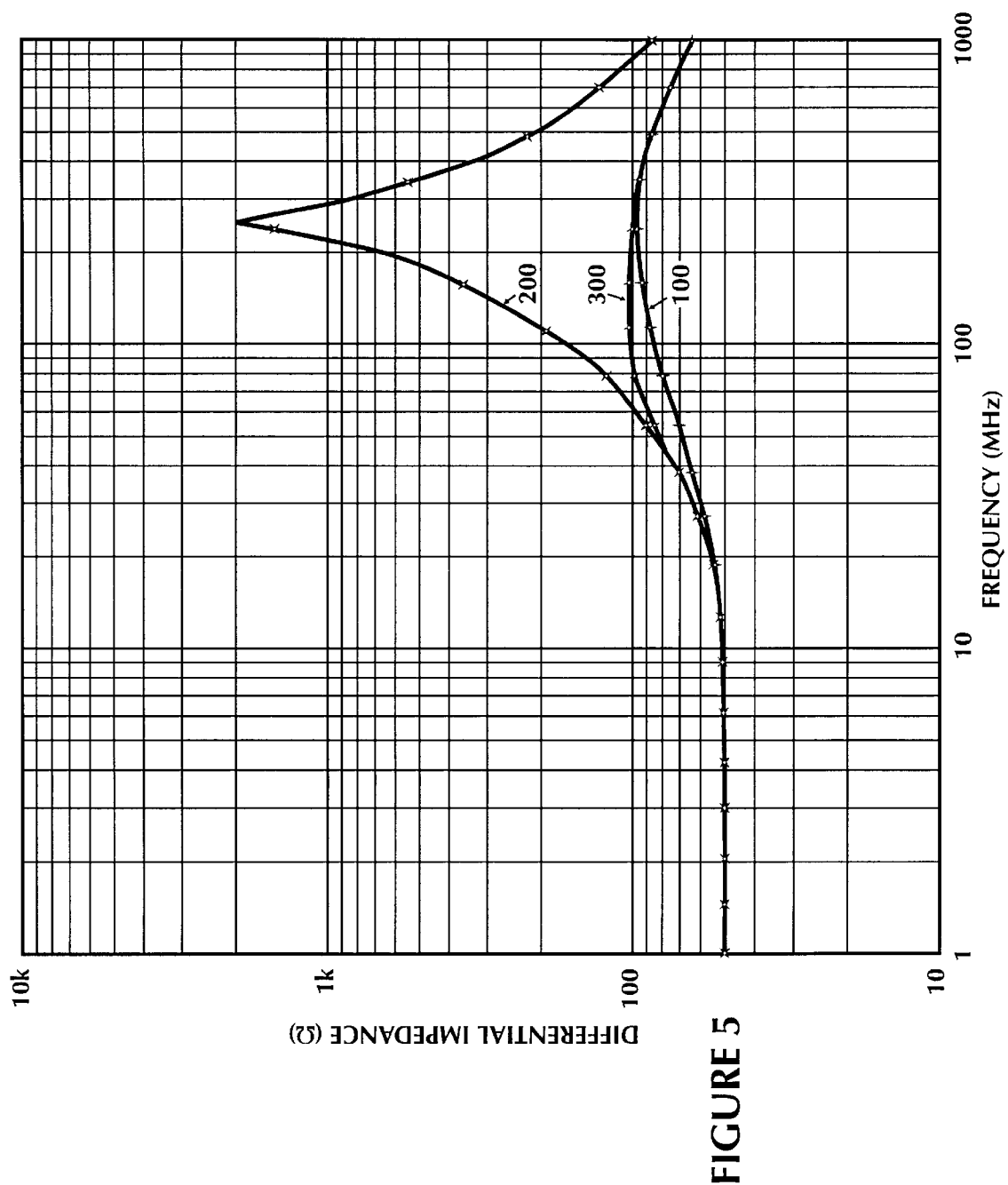
FIG. 5 illustrates simulated graphs of impedance vs. frequency for the two-port models of FIGS. 2–5.

FIG. 5 illustrates simulated graphs of impedance vs. frequency for the two-port models of FIGS. 2 through 4. This is the impedance seen by the 100BASE-TX transmitter. The vertical scale is impedance in ohms and the horizontal scale is frequency in hertz. The first curve 100 represents the relationship between impedance and frequency for the two-port network shown in FIG. 2. The second curve 200 represents the relationship between impedance and frequency for the two-port network shown in FIG. 3. The third curve 300 represents the relationship between impedance and frequency for the two-port network shown in FIG. 4.

As can be seen from FIG. 5, the impedance of the first curve 100 (a single 100BASE-TX termination) is 50 ohms at low frequencies, but increases to 100 ohms at intermediate frequencies due to the leakage inductance Lleak in series with the twisted pair network. At high frequencies, the impedance decreases due to the parasitic capacitance Cxmit of the transmitter. The impedance of the second curve 200 (dual 10BASE-T and 100BASE-TX termination without snubber) is 50 ohms at low frequencies, but increases dramatically because of the load inductance Lleak2 and the termination inductance Lleak1. Beyond 250 MHz, the impedance drops due to the parasitic capacitance Cxmit of the transmitter. The impedance of the third curve 300 (representing the dual 10BASE-T and 100BASE-TX termination with snubber) is dominated by the snubber over intermediate frequencies.

The transmission termination circuit of the present invention prevents signal reflection over the transmission lines by maintaining an impedance match over a wide range of frequencies, as is shown by the curve 300. It will be apparent that changing the value of R3 or the value of C1 will alter the shape of the third curve 300.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein and to substitute components disclosed therein for others, such as substituting a bipolar transistor for a FET. Further, it will be apparent that the snubber of the present invention could be constructed as shown in FIG. 1 or, alternatively, could have other combinations of resistance and capacitance to achieve a similar result, such as by reversing the order of the resistor and capacitor or by having two resistors, one coupled to each terminal of the capacitor, etc. It will be apparent that different formats for transmitting data, other than the 10BASE-T and 100BASE-TX formats disclosed herein, could be employed. In addition, the invention could be used with networks having impedance values other than the twisted pair network disclosed herein having an impedance of 100 ohms.

What is claimed is:

1. A dual transmission termination circuit comprising:
  a. a transformer having a first primary winding, a second primary winding and a secondary winding;
  b. a first transmitter having a differential voltage driven transmit output pair coupled to the first primary winding;
  c. a second transmitter having a differential current driven transmit output pair coupled to the second primary winding;
  d. a resistive snubber circuit coupled to the second primary winding;
  e. means for selecting between activating the first transmitter while de-activating the second transmitter and activating the second transmitter while de-activating the first transmitter the means for selecting coupled to the first transmitter and coupled to the second transmitter; and
  f. means for shorting the voltage driven transmit output pair to a ground node when the first transmitter is de-activated wherein the means for shorting is coupled to the first transmitter.

2. The dual transmission termination circuit according to claim 1 wherein the resistive snubber comprises:
  a. a first resistor having a first resistor terminal and a second resistor terminal wherein the first resistor terminal is coupled to a first terminal of the second primary winding; and
  b. a first capacitor having a first capacitor terminal and a second capacitor terminal wherein the first capacitor terminal is coupled to the second resistor terminal and the second capacitor terminal is coupled to a second terminal of the second primary winding.

3. The dual transmission termination circuit according to claim 2 wherein the first primary winding has a ratio of turns to the secondary winding of 1-to-2.

4. The dual transmission termination circuit according to claim 3 wherein the second primary winding has a ratio of turns to the secondary winding of 1-to-1.

5. The dual transmission termination circuit according to claim 2 wherein the second primary winding has a ratio of turns to the secondary winding of 1-to-1.

6. The dual transmission termination circuit according to claim 2 further comprising a twisted pair network coupled to the secondary winding of the transformer.

7. The dual transmission termination circuit according to claim 2 wherein the first transmitter transmits data at 10 mega-bits per second and the second transmitter transmits data at 100 mega-bits per second.

8. The dual transmission termination circuit according to claim 7 wherein the first transmitter is a 10BASE-T transmitter and the second transmitter is a 100BASE-TX transmitter.

9. The dual transmission termination circuit according to claim 2 wherein the differential voltage driven transmit output pair comprises a first voltage driven transmit output and a second voltage driven transmit output, wherein the first and second voltage driven transmit outputs are each in a high impedance state when the first transmitter is de-activated and further wherein the differential current driven transmit output pair comprises a first current driven transmit output and a second current driven transmit output, wherein the first and second current driven transmit outputs are in a high impedance state when the second transmitter is de-activated.

10. The dual transmission termination circuit according to claim 9 wherein the means for shorting comprises:
  a. a first transistor having a first drain, a first source and a first gate wherein the first drain is coupled to the first voltage driven transmit output, the first gate is coupled to the means for selecting and the first source is coupled to the ground node; and
  b. a second transistor having a second drain, a second source and a second gate wherein the second drain is coupled to the second voltage driven transmit output, the second gate is coupled to the means for selecting and the second source is coupled to the ground node.

11. The dual transmission termination circuit according to claim 10 wherein the second primary winding has center tap and wherein the center tap is coupled to receive a predetermined voltage level.

12. A dual transmission termination circuit comprising:
   a. a transmit transformer having a first primary winding, a second primary winding and a secondary winding wherein a first terminal of the first primary winding is coupled to a first terminal of a first termination resistor and wherein a second terminal of the first primary winding is coupled to a first terminal of a second termination resistor;
   b. a first transmitter having a first voltage driven transmit output and a second voltage driven transmit output wherein the first and second voltage driven transmit outputs comprise a voltage driven differential transmit output pair and further wherein the first voltage driven transmit output is coupled to a second terminal of the first termination resistor and the second transmit output is coupled to a second terminal of the second termination resistor;
   c. a second transmitter having a first current driven transmit output and a second current driven transmit output wherein the first and second current driven transmit outputs comprise a current driven differential transmit output pair and wherein a first terminal of the second primary winding is coupled to the first current driven transmit output and a second terminal of the second primary winding is coupled to the second current driven transmit output;
   d. a snubber circuit having a first snubber terminal and a second snubber terminal wherein the first snubber terminal is coupled to the first terminal of the second primary winding and the second snubber terminal is coupled to the second terminal of the second primary winding; and
   e. means for selectively shorting the first and second voltage driven transmit outputs to a ground node.

13. The dual transmission termination circuit according to claim 12 wherein the first transmitter transmits data at 10 mega-bits per second and the second transmitter transmits data at 100 mega-bits per second.

14. The dual transmission termination circuit according to claim 13 wherein the first transmitter is a 10BASE-T transmitter and the second transmitter is a 100BASE-TX transmitter.

15. The dual transmission termination circuit according to claim 12 wherein the snubber comprises a snubber resistor and a snubber capacitor wherein the snubber resistor and the snubber capacitor are coupled in series with each other.

16. The dual transmission termination circuit according to claim 15 wherein the snubber resistor has a resistance of approximately 100 ohms.

17. The dual transmission termination circuit according to claim 15 wherein the snubber capacitor has a capacitance of approximately 25 pF.

18. The dual transmission termination circuit according to claim 15 further comprising a twisted pair network coupled to a secondary winding of the transformer.

19. The dual transmission termination circuit according to claim 12 wherein the first transmitter has a power down input coupled to be controlled by a control signal and the second transmitter has a negated power down input coupled to be controlled by the control signal whereby the first transmitter may be activated while the second transmitter may be de-activated by setting the control signal to a first logic level and the first transmitter may be de-activated while the second transmitter may be activated by setting the control signal to a second logic level and wherein the transmit outputs of a de-activated transmitter are in a high impedance state.

20. The dual transmission termination circuit according to claim 19 further comprising:
   a. a first transistor having a first drain, a first source and a first gate wherein the first drain is coupled to the first voltage driven transmit output, the first gate is coupled to be controlled by the control signal and the first source is coupled to a ground node; and
   b. a second transistor having a second drain, a second source and a second gate wherein the second drain is coupled to the second voltage driven transmit output, the second gate is coupled to be controlled by the control signal and the second source is coupled to the ground node.

21. A method of transmitting data over a computer network to other circuits in the network comprising the step of:
   a. transmitting the data from a first transmitter circuit having a differential voltage driven transmit output pair coupled to a first primary winding of a transmit transformer and inductively coupled to a second primary winding of the transmit transformer wherein the second primary winding is loaded by a resistive snubber and loaded by a high impedance differential current driven transmit output pair of a second transmitter circuit, wherein the resistive snubber comprises a capacitor and a resistor coupled in series and wherein the resistive snubber is coupled across the differential current driven transmit output pair of the second transmitter; and
   b. transmitting the data from the second transmitter circuit while coupling the differential voltage driven transmit output pair of the first transmitter circuit a whereby voltage transients caused by the leakage inductance of the transformer and the first transmitter circuit are inhibited.

22. The method according to claim 21 wherein the first transmitter transmits data at 10 mega-bits per second and the second transmitter transmits data at 100 mega-bits per second.

23. The method according to claim 22 wherein the first transmitter circuit comprises a 10BASE-T transceiver and the second transmitter circuit comprises a 100BASE-TX transceiver.

* * * * *

UNITED STATES PATENT AND TRADEMARK OFFICE
CERTIFICATE OF CORRECTION

PATENT NO.    :   5,838,723

DATED         :   November 17, 1998

INVENTOR(S)   :   Michael Mack et al.

It is certified that error appears in the above-identified patent and that said Letters Patent is hereby correct as shown below:

Column 10, line 43, delete "coupling" and insert --grounding--.

Signed and Sealed this

Eighth Day of June, 1999

Attest:

Q. TODD DICKINSON

*Attesting Officer*    Acting Commissioner of Patents and Trademarks